(12) United States Patent
Modave et al.

(10) Patent No.: US 9,036,414 B2
(45) Date of Patent: *May 19, 2015

(54) TEMPORARY LOCKING OF AN ELECTRONIC CIRCUIT TO PROTECT DATA CONTAINED IN THE ELECTRONIC CIRCUIT

(75) Inventors: Jean-Louis Modave, Ottignies (BE); Thierry Huque, Ramillies (BE)

(73) Assignee: Proton World International N.V., Zaventem (BE)

( * ) Notice: Subject to any disclaimer, the term of this patent is extended or adjusted under 35 U.S.C. 154(b) by 460 days.

This patent is subject to a terminal disclaimer.

(21) Appl. No.: 12/521,773

(22) PCT Filed: Jan. 4, 2008

(86) PCT No.: PCT/EP2008/050074
§ 371 (c)(1),
(2), (4) Date: Sep. 28, 2010

(87) PCT Pub. No.: WO2008/084018
PCT Pub. Date: Jul. 17, 2008

(65) Prior Publication Data
US 2011/0007567 A1    Jan. 13, 2011

(30) Foreign Application Priority Data
Jan. 5, 2007 (FR) ..................... 07 52553

(51) Int. Cl.
*G11C 11/34* (2006.01)
*G07F 7/08* (2006.01)
(Continued)

(52) U.S. Cl.
CPC .............. *G07F 7/084* (2013.01); *G06F 21/558* (2013.01); *G06F 21/75* (2013.01); *G06F 21/77* (2013.01); *G06Q 20/341* (2013.01); *G06Q 20/3576* (2013.01); *G07F 7/082* (2013.01);
(Continued)

(58) Field of Classification Search
CPC ....... G06F 21/558; G06F 21/75; G06F 21/77; G07F 7/1008; G11C 16/22
USPC .............................................. 365/185.04, 149
See application file for complete search history.

(56) References Cited

U.S. PATENT DOCUMENTS 3,906,460 A     9/1975 Halpern
4,028,733 A *   6/1977 Ulicki ........................... 386/201
(Continued)

FOREIGN PATENT DOCUMENTS

WO      WO 98/29813 A      7/1998
WO      WO 99/56253 A     11/1999
WO      WO 2004029873 A1   4/2004

OTHER PUBLICATIONS

Microsoft, Window 2000 Configuring Account Lockout Policies, http://technet.microsoft.com/en-us/library/dd277400.aspx.*

(Continued)

*Primary Examiner* — Vanthu Nguyen
*Assistant Examiner* — Khamdan Alrobaie
(74) *Attorney, Agent, or Firm* — Seed IP Law Group PLLC (57) ABSTRACT

A method and a circuit for protecting at least one piece of information contained in an electronic circuit by disabling at least one function of the circuit in case of detection of a number of abnormal operations greater than a threshold, in which the disabling of the function is temporary, of a duration independent from whether the circuit is powered or not.

20 Claims, 9 Drawing Sheets (51) Int. Cl.
*G06F 21/55* (2013.01)
*G06F 21/75* (2013.01)
*G06F 21/77* (2013.01)
*G06Q 20/34* (2012.01)
*G07F 7/10* (2006.01)
*H01L 27/115* (2006.01)

(52) U.S. Cl.
CPC ........... *G07F 7/1008* (2013.01); *H01L 27/115* (2013.01); *H01L 27/11521* (2013.01); *H01L 27/11524* (2013.01)

(56) References Cited

U.S. PATENT DOCUMENTS

| | | | |
|---|---|---|---|
| 4,211,919 | A | 7/1980 | Ugon |
| 4,484,067 | A * | 11/1984 | Obrecht ................ 235/380 |
| 4,734,568 | A | 3/1988 | Watanabe |
| 4,983,816 | A | 1/1991 | Iijima |
| 5,465,349 | A | 11/1995 | Geronimi et al. |
| 5,652,729 | A | 7/1997 | Iwata et al. |
| 6,188,309 | B1 * | 2/2001 | Levine ................ 340/5.66 |
| 6,356,126 | B1 | 3/2002 | Anderson et al. |
| 7,258,271 | B2 | 8/2007 | Vidal |
| 7,330,979 | B1 | 2/2008 | Hazard |
| 7,496,738 | B2 | 2/2009 | Modave |
| 7,516,902 | B2 | 4/2009 | Modave |
| 7,660,169 | B2 | 2/2010 | Otterstedt et al. |
| 7,739,520 | B2 | 6/2010 | Horvat et al. |
| 7,962,760 | B2 | 6/2011 | Ferren et al. |
| 8,036,020 | B2 * | 10/2011 | La Rosa ................ 365/149 |
| 8,122,079 | B2 | 2/2012 | Van Assche et al. |
| 8,320,176 | B2 * | 11/2012 | La Rosa ............. 365/185.05 |
| 8,331,203 | B2 * | 12/2012 | La Rosa ................ 368/113 |
| 8,339,848 | B2 * | 12/2012 | La Rosa ............. 365/185.05 |
| 2001/0010331 | A1 | 8/2001 | Hazard |
| 2003/0005315 | A1 * | 1/2003 | Horvat et al. ............ 713/189 |
| 2004/0078589 | A1 | 4/2004 | Giraud |
| 2005/0135411 | A1 | 6/2005 | Sureaud |
| 2006/0112436 | A1 | 5/2006 | Modave |
| 2007/0220603 | A1 | 9/2007 | Chamberot |
| 2010/0020648 | A1 | 1/2010 | La Rosa |
| 2010/0027334 | A1 | 2/2010 | La Rosa |
| 2010/0054024 | A1 * | 3/2010 | La Rosa ................ 365/149 |
| 2010/0054038 | A1 | 3/2010 | La Rosa |
| 2011/0010775 | A1 | 1/2011 | Modave et al. |
| 2011/0122694 | A1 | 5/2011 | Modave et al. |
| 2012/0206152 | A1 | 8/2012 | Naruse et al. |
| 2012/0206153 | A1 | 8/2012 | Naruse et al. |

OTHER PUBLICATIONS

International Search Report dated Apr. 7, 2008, from corresponding International Application No. PCT/EP2008/050073.
International Search Report dated Apr. 14, 2008, from International Application No. PCT/EP2008/050073.
International Search Report dated Apr. 14, 2008, from International Application No. PCT/EP2008/050074.
International Search Report dated Apr. 15, 2008, from International Application No. PCT/EP2008/050072.
English Translation of Written Opinion of the International Searching Authority from International Application No. PCT/EP2008/050073.
English Translation of Written Opinion of the International Searching Authority from International Application No. PCT/EP2008/050074.
English Translation of Written Opinion of the International Searching Authority from International Application No. PCT/EP2008/050072.

* cited by examiner

PRIOR ART

TEMPORARY LOCKING OF AN ELECTRONIC CIRCUIT TO PROTECT DATA CONTAINED IN THE ELECTRONIC CIRCUIT

CROSS REFERENCE TO RELATED APPLICATIONS

This application claims the priority benefit of French patent application number 07/52553, filed on Jan. 5, 2007, entitled "Temporary Locking of an Electronic Circuit," which is hereby incorporated by reference to the maximum extent allowable by law.

BACKGROUND OF THE INVENTION

1. Field of the Invention

The present invention generally relates to electronic circuits and, more specifically, to the protection of information contained in an electronic circuit. The information may be digital quantities supposed to remain secret (that is, within the electronic circuit), for example, access codes or passwords, or specific steps of algorithms and, more generally, any digital data not to be communicated in uncontrolled fashion.

The present invention more specifically applies to mechanisms of authentication of electronic circuits, of applications executed by electronic circuits or of their users, by means of a code or a key interpreted by these circuits. An example of application relates to circuits containing a mechanism of user authentication by verification of a user code received by the circuit. Another example of application relates to the protection of authentication, ciphering, or signature keys against possible hacking attempts.

The present invention will be described hereafter in relation with an example of application to smart cards, but it more generally applies to any electronic circuit containing information with a controlled circulation, be the circuit on a smart card, isolated, or assembled on an electronic board of a more complex device.

2. Discussion of the Related Art

On use of a smart card, for example, of bank or mobile phone type, the user is authenticated by keying in a code (PIN code) on a keyboard of a device (for example, a bank terminal or the cellular phone) capable of communicating this code to the electronic circuit of the card for comparison with a reference code. One of the objects of the user authentication by the card is to avoid for the user code to be stored elsewhere than in the actual card.

Authentication mechanisms generally do not enable making the difference between the keying in of too many codes in a fraud attempt or when the user has forgotten his code. In the case of an incidental blocking of the electronic circuit by the authorized user, a first solution is to replace the card. Such a solution is expensive since the card is disposed of. Another solution is, for the provider of the card, to send a specific control signal thereto to unlock it. Such a solution however requires an appropriate infrastructure to unlock the card.

More generally, the above-described protection authentication mechanisms amount to detecting an abnormal circuit operation (considering that a lack of authentication is abnormal) and to blocking the circuit or some of its functions after a given number of detections, to protect information contained in the circuit.

SUMMARY OF THE INVENTION

At least one embodiment of the present invention aims at overcoming all or part of the disadvantages of known mechanisms of protection against lacks of authentication.

An embodiment aims at an authentication mechanism which avoids the need to replace the involved electronic circuits.

An embodiment aims at a solution avoiding implementation of an unlocking process by the circuit provider.

An embodiment aims at a solution compatible with direct authentications by comparison of codes and with signature verification mechanisms.

An embodiment also aims at a solution compatible with the protection of passwords of secondary applications.

More generally, an embodiment aims at overcoming the disadvantages of mechanisms for protecting information with a controlled communication contained in an electronic circuit, which comprise detecting a circuit operation considered as abnormal and blocking all or part of the functions of this circuit when the number of detected malfunctions exceeds a threshold.

To achieve all or part of these objects, as well as others, at least one embodiment of the present invention provides a method for protecting at least one piece of information contained in an electronic circuit by disabling at least one circuit function in case of a detection of a number of abnormal operations greater than a threshold, in which the disabling of said function is temporary, of a duration independent from whether the circuit is powered or not.

According to an embodiment, said disabling duration is set by at least one charge retention circuit having at least one first capacitive element exhibiting a leakage through its dielectric space.

According to an embodiment, the function disabling is caused by an injection or extraction of charges into or from said first capacitive element.

According to an embodiment, an abnormal operation is a failure of an authentication try using a piece of information to be protected.

According to an embodiment, the method is applied to the authentication of a user of the circuit by provision of an authentication code.

According to an embodiment, the method is applied to the authentication of data received by the circuit by verification of a signature.

According to an embodiment, the duration of the disabling of the operation of the circuit ranges between one hour and one week.

An embodiment provides an electronic circuit capable of implementing the method and in which the or each charge retention circuit comprises:

at least one first capacitive element having a first electrode connected to a floating node;

at least one second capacitive element having a first electrode connected to said floating node, the second capacitive element having a greater capacitance than the first one; and at least one first transistor with an insulated control terminal connected to said floating node.

According to an embodiment, at least one third capacitive element has a first electrode connected to said floating node and a second electrode connectable to a voltage source.

According to an embodiment, the circuit is implanted in a network of EEPROM-type memory cells, each comprising a selection transistor in series with a floating-gate transistor, and in which, on a same row of memory cells where the respective floating gates of the cell transistors are interconnected:

the first capacitive element comprises a first subset of at least one first cell where the thickness of the dielectric of the tunnel window of the floating gate transistor is smaller than that of the other cells;

the second capacitive element comprises a second subset of at least one second cell where the drain and the source of the floating-gate transistor are interconnected;

the third capacitive element comprises a third subset of at least one third cell; and the first transistor comprises a fourth subset of at least one fourth cell having its tunnel window eliminated.

The foregoing and other objects, features, and advantages of the present invention will be discussed in detail in the following non-limiting description of specific embodiments in connection with the accompanying drawings.

DETAILED DESCRIPTION

The same elements have been designated with the same reference numerals in the different drawings.

For clarity, only those elements and steps which are useful to the understanding of the present invention have been shown in the drawings and will be described hereafter. In particular, the actual code transmission and signature calculation mechanisms have not been illustrated, the present invention being compatible with usual mechanisms. Similarly, the actions taken by the electronic devices after an authentication error have not been detailed, the present invention being here again compatible with usual actions.

Figure 1:
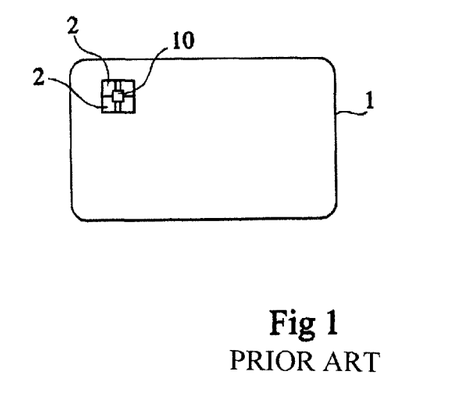
FIG. 1 shows a smart card of the type to which the present invention applies as an example.

FIG. 1 schematically shows a smart card 1 of the type to which the present invention applies as an example. Such a card is formed of a support, generally made of plastic matter, on or in which are embedded one or several electronic circuits 10. Circuit 10 is capable of communicating with a terminal by means of contacts 2 and/or without contact (radioelectric transmission or transmission by modulation of an electromagnetic field of a terminal).

Figure 2:
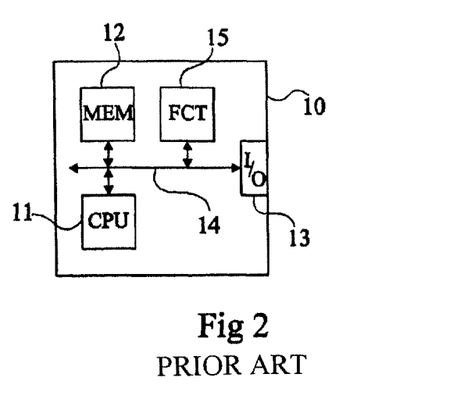
FIG. 2 shows an electronic circuit of the type to which the present invention applies as an example.

FIG. 2 very schematically shows in the form of blocks an electronic circuit 10 (for example, of a smart card 1 of FIG. 1) of the type to which the present invention applies as an example. Circuit 10 comprises, among others, a digital processing unit 11 (for example, a central processing unit—CPU), one or several memories 12 (MEM) among which at least one non-volatile memory (for example, of EEPROM type) and one input/output circuit (I/O) 13 to communicate with the outside of the circuit (for connection with contacts 2 or with an antenna). The different elements internal to the circuit communicate together and with interface 13 over one or several data, address, and control buses 14, as well as over possible direct connections between some of these elements. Circuit 10 may also integrate other software or hardware functions. These functions have been symbolized by a block 15 (FCT) in FIG. 2.

Reference will be made hereafter to the user authentication by means of a keyed-in PIN code. The present invention however applies to other identification means (for example, biometric means) provided that at one step or another of the processing, the authentication uses a comparison, in the electronic circuit, of a current authentication datum with one or several reference data.

Figure 3:
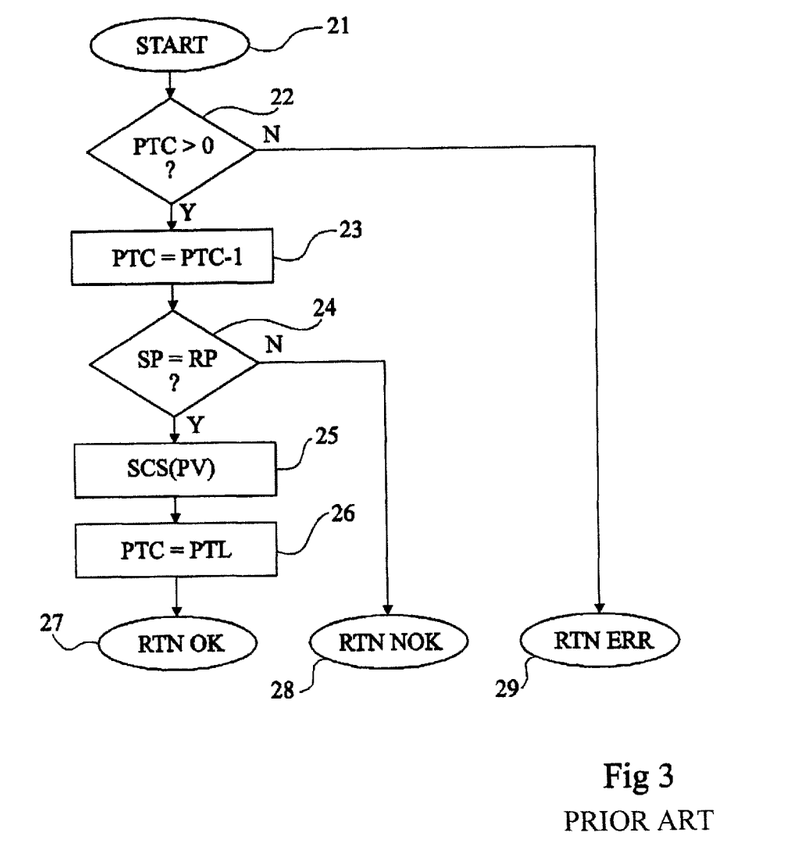
FIG. 3 is a functional diagram illustrating a PIN code verification mechanism.

FIG. 3 is a timing diagram very schematically illustrating a current mechanism of authentication of a smart card user by keying in of his PIN code. This code is keyed in on a reader (not shown) and is transmitted, generally, over a secure link, to circuit 10 of the card for verification.

The mechanism starts (block 21, START) with the receiving of the PIN code by circuit 10.

Before performing the comparison with the code stored in the card, it is verified (block 22, PTC>0?) that the number of code keying tries (more specifically of verifications by the card of a received code) does not exceed a threshold. This threshold is set by initialization of a pin try counter (PTC) to a limiting number (PTL—pin try limit), for example, 3. This initialization is performed upon initial putting into service of the card, then each time an authentication is enabled.

In the case where there remain possible tries (output Y of block 22), the pin try counter is decremented by one (block 23, PTC=PTC-1). Then, circuit 10 verifies (block 24, SP=RP?) whether the current PIN code (SP—submitted PIN) received from the terminal is identical to the reference PIN code (RP) stored in non-volatile fashion in circuit 10. If so (output Y of block 24), circuit 10 sets a word or a bit SCS indicative of the card state (Set Card Status) in a state indicating that the PIN code is valid (block 25, SCS(PV)—Set Card Status (PIN verified)). Then (block 26, PTC=PTL), try counter PTC is reset to its limiting number PTL. Finally (block 27, RTN OK), the circuit provides the reader with a positive authentication response.

If the code provided to the circuit is not correct (output N of block 24), the circuit directly returns to the reader a no-authentication message (block 28, RTN NOK). This lack of authentication however leaves the user the possibility to retry as long as he has not used up the number stored in counter PTC. At the end of a number (set by threshold PTL) of unsuccessful tries, the value stored by counter PTC becomes zero. In this case, at a next try (output N of block 22), the card returns an error to the reader (block 29, RTN ERR).

The error processing in case the number of tries is exceeded is different from the lack of authentication, to avoid risks of hacking by keying in a large number of codes by the person attempting fraud. For example, this error processing definitively blocks the card by storing a flag disabling its operation, which is tested on each powering-on of circuit 10.

The try counter is generally stored in a reprogrammable non-volatile memory (typically an EEPROM) of the electronic circuit. Thus, whatever the time which elapses between two tries, the counter is only reset after a valid try.

Figure 4:
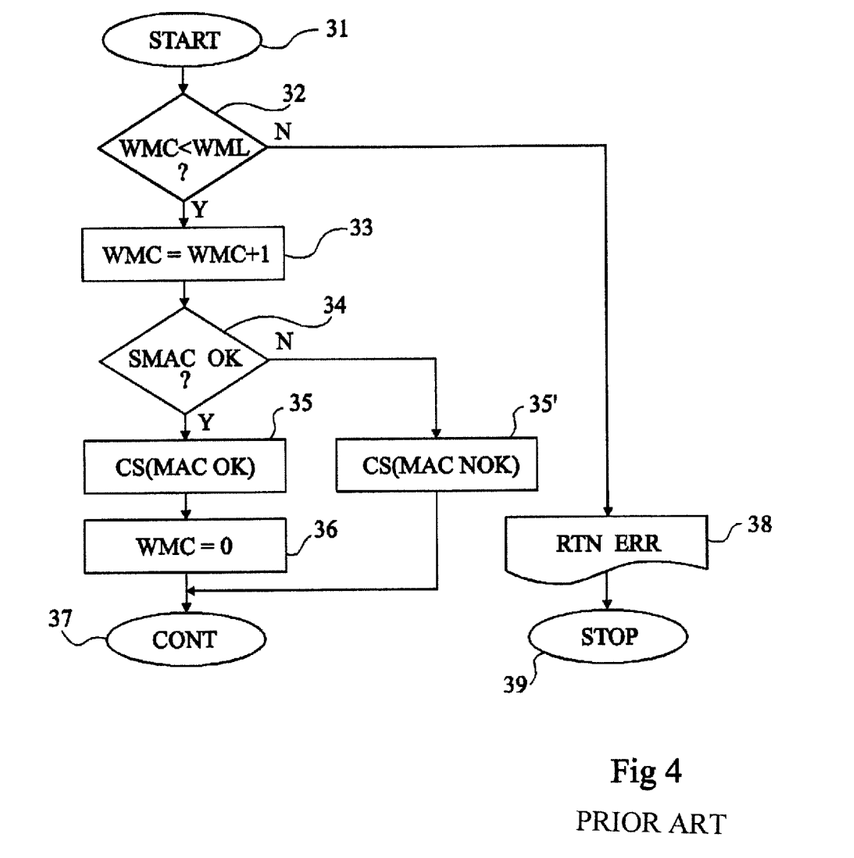
FIG. 4 is a functional diagram illustrating a signature verification mechanism.

FIG. 4 is a simplified flowchart illustrating a usual mechanism of protection of a key used to authenticate transmissions by transmitted message signature processes. Such protection mechanisms are generally called key ratification mechanisms. They verify, on the receiver side, the number of signature verifications resulting in a failure (use of a wrong key by the user), since too large a number can indicate a fraud try aiming at discovering the secret key used by the receiver.

In a signed transmission, a message authentication code, generally called message signature, is calculated by the transmitter by means of a key that it contains (its private key in the case of an asymmetrical algorithm or a shared secret key in the case of a symmetrical algorithm). The message is transmitted (ciphered or not) to the addressee along with the signature (ciphered or not). The addressee verifies the origin of the message by verifying the signature, by means of the public key of the transmitter in the case of an asymmetrical algorithm or of the shared secret key in the case of a symmetrical algorithm. Some attacks comprising examining the circuit behavior (power consumption, thermal radiation, electromagnetic analysis, etc.) by submitting messages signed with wrong keys or by making assumptions as to the key, enable discovering the key which is supposed to remain.

To protect a key used by circuit 10, it is thus verified that the signature calculation is not performed too many times, resulting in a lack of authentication of the transmitter (wrong signature).

The method of FIG. 4 starts (block 31, START) with the receiving of a signature SMAC (submitted message authentication code) originating from another device.

A counter (WMC—Wrong MAC Counter) of the number of wrong signatures verified by the circuit is compared (block 32, WMC<WML?) with a limiting number (WML—Wrong MAC Limit). The limiting number is set according to the applications and to the security desired for the system.

If the limiting number of signatures is not reached (output Y of block 32), counter WMC is incremented (block 33, WMC=WMC+1). Then (block 34, SMAC/KEY OK?), circuit 10 verifies current signature SMAC with the key KEY that it contains. This verification can take various forms, for example, a recalculation of the signature from the message and from the key.

If signature SMAC is correct (output Y of block 34), the electronic device updates (block 35, CS(MAC OK)) a status indicator CS (Card Status) indicating a satisfactory verification (MAC OK). Wrong signature counter WMC is then reset (block 36, WMC=0) before exiting the authentication mechanism by continuing the application having called this authentication (block 37, CONT).

In case of an incorrect signature (output N of block 34), circuit 10 sets (block 35', CS(MAC NOK)) status indicator CS in a state (MAC NOK) enabling the application having requested the authentication to process a lack of correct signature.

If wrong signature counter WMC reaches limit WML (output N of block 32), the authentication mechanism returns an error message (block 38, RTN ERR). In this example of application, the error message results in blocking the execution of the subsequent processings (block 39, STOP). This blocking can involve the use of the key, some circuit functions, or the full circuit. The circuit remains in this state, either until replacement of the card, or until implementation of an unlocking procedure requiring a specific infrastructure.

Further, in certain cases, such a counter protection is difficult to envisage. For example, when the signature verification concerns the reader used for the transmission of the PIN codes keyed in by the user, if a single key is present on the card and said card is blocked by the verification mechanism, the card can no longer be unlocked by using a signed control signal, since the key which needs to verify the signature is blocked.

In the case of FIG. 3, the authentication requiring a key is performed by the actual electronic circuit 10, to avoid taking the key out of there. The status of the wrong signature counter is generally stored in a reprogrammable non-volatile memory (EEPROM). The limiting number of wrong signatures WML as well as key KEY are generally stored in a non-volatile memory, reprogrammable or not.

Another example of application relates to electronic circuits or devices implementing secondary applications (for example, so-called PKI (public key infrastructure) applications) requiring passwords different from a main code (for example, the PIN code) of user authentication by a main application. A password dedicated to a PKI application is then used after the PIN code has been successfully verified by the master application of the card. A signature key is further generally used to sign data, documents, or transactions. This key can only be used when a correct password has been provided to the circuit. The password creation is generally controlled by the actual card holder and not by the provider. The passwords of the secondary applications also should be protected against fraud attempts by detection of too many invalid tries.

A problem is that, to avoid that the card is definitively blocked, its provider needs to be capable of unlocking not only the PIN code, but also the passwords used for other applications. As a result, the provider is able to know (to find) the passwords created by the user, which is not desirable. This problem is usually called a "repudiation".

The fact that the card is not permanently powered introduces an additional difficulty which makes protection mechanisms exploiting volatile memories ineffective.

Figure 5:
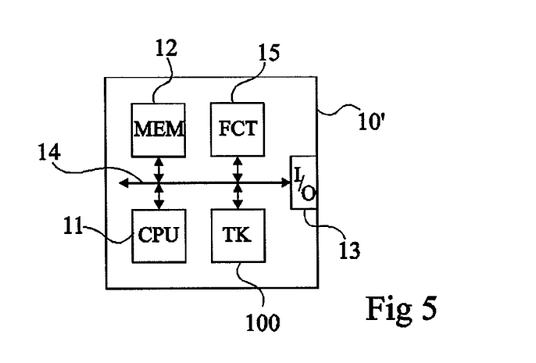
FIG. 5 very schematically shows in the form of blocks an embodiment of an electronic circuit.

FIG. 5 very schematically shows in the form of blocks, in a view to be compared with FIG. 2, an embodiment of an electronic circuit 10'.

As previously, circuit 10' comprises a central processing unit 11 (CPU) capable of controlling its operation, be it in hardware and/or in software fashion, one or several memories 12 (MEM) among which at least one reprogrammable non-volatile memory, an input/output circuit 13 (I/O), and various hardware or software functions symbolized by a block 15 (FCT) depending on the application.

According to this embodiment, circuit 10' also comprises at least one charge retention circuit 100 (TK) having its charge level varying along time, even when circuit 10' is not powered.

Detailed examples of circuits 100 will be described subsequently in relation with FIG. 8 et seq. For the time being, it should only be noted that a circuit 100 is capable of being programmed or activated (placed in a state arbitrarily designated as 1) by injection or extraction of charges into or from a capacitive element which exhibits a leakage through its dielectric space, so that its active state disappears (the element switches back to state 0) after a given time, independently from the possible circuit power supply.

According to an embodiment, circuit 100 is used to temporarily deactivate the functions which are associated with an authentication mechanism when an excessive number of incorrect authentication tries is detected. Circuit 100 is then used to store a bit (flag) indicative of the need to deactivate the corresponding software or hardware resource.

More generally, a charge retention circuit of the type of circuit 100 is used to store a bit (flag) conditioning the access to all or part of the resources of an electronic circuit, circuit 100 being activated in case a threshold is exceeded by a malfunction counter, the state of this counter being stored in a memory, preferably non-volatile, of the circuit.

Figure 6:
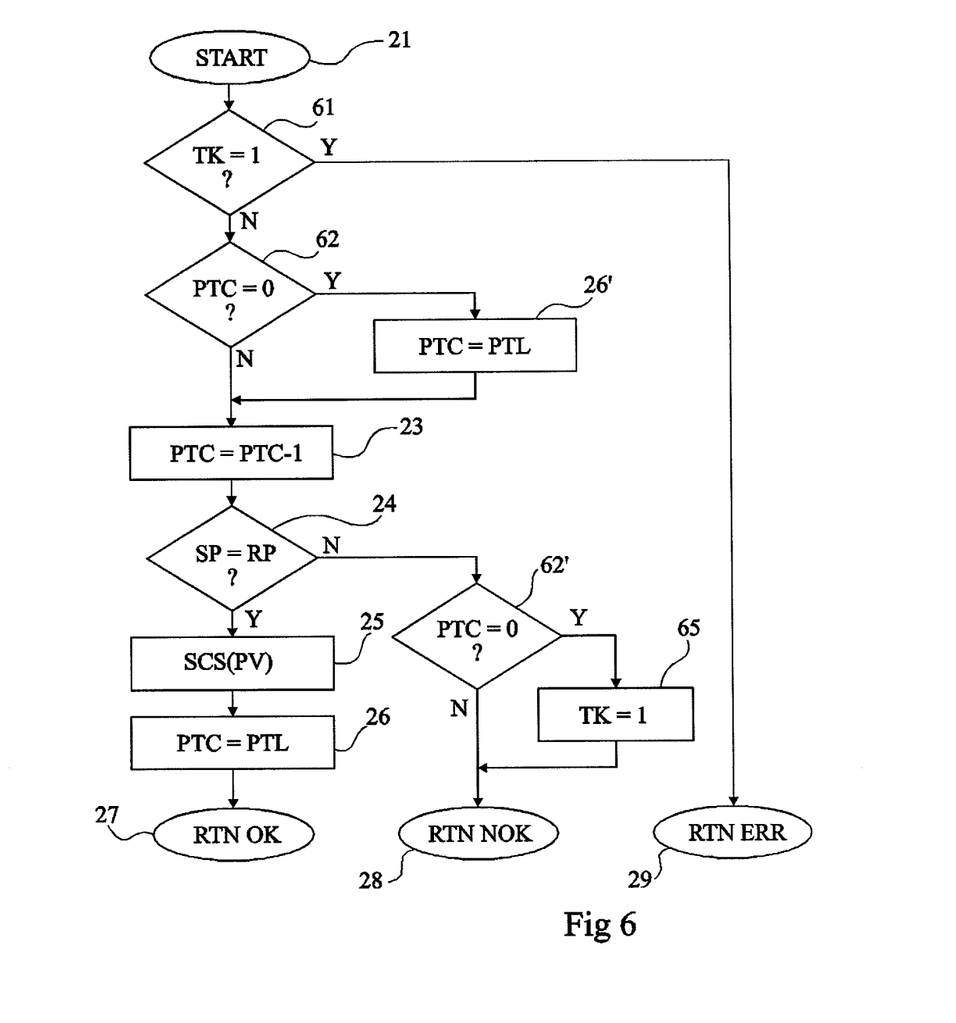
FIG. 6 is a functional diagram of an embodiment applied to the verification of a PIN code.

FIG. 6 is a functional block diagram illustrating this first embodiment, applied to the keying in of a code of access to a resource. FIG. 6 should be compared with previously-described FIG. 3 by taking as an example the keying in of a PIN code in a smart card.

As previously, the authentication mechanism starts (block 21, START) once a PIN code has been received by the card.

The state of the time flag stored by circuit 100 is first verified (block 61, TK=1?). If it is in an inactive state (output N of block 61), this means that the process of authentication by keying in of a PIN code can carry on. It is then tested (block 62, PTC=0?) whether try counter PTC is at zero. If not (output N of block 62), counter PTC is decremented by one (block 23, PTC=PTC−1). If counter PTC is at zero (output Y of block 62), it is reset (block 26', PTC=PTL) to limiting number PTL before step 23.

Then, submitted code SP is compared (block 24, SP=RP?) with reference code RP stored in the card.

In case of an identity (output Y of block 24), the card enables its status indicator (block 25, SCS(PV)), then resets the try counter (block 26, PTC=PTL) before returning a positive test result to the rest of the application (block 27, RTN OK).

If submitted code SP is different from reference code RP (output N of block 24), the value of the try counter is compared (block 62', PTC=0?) with zero. If the counter is not at zero (output N of block 62'), this means that there remains at least one available try and the mechanism returns a lack of authentication (block 28, RTN NOK). However, if counter PTC has a zero value (output Y of block 62'), charge retention circuit 100 is activated (block 65, TK=1) before providing (block 28) the no-authentication result. Indeed, this then means that the last try has been performed by the user. After, due to test 61, as long (output Y of block 61) as charge retention circuit 100 has not returned to an inactive state, no new authentication is possible. The card returns an error message (block 29, RTN ERR) without performing the code comparison. Processings 28 and 29 may be one and the same. The card then does not need to differentiate a lack of authentication from a wrong authentication.

The embodiment of FIG. 6 corresponds to temporarily blocking the smart card PIN code since flag TK is reset at the end of a time period set by charge retention circuit 100.

Figure 7:
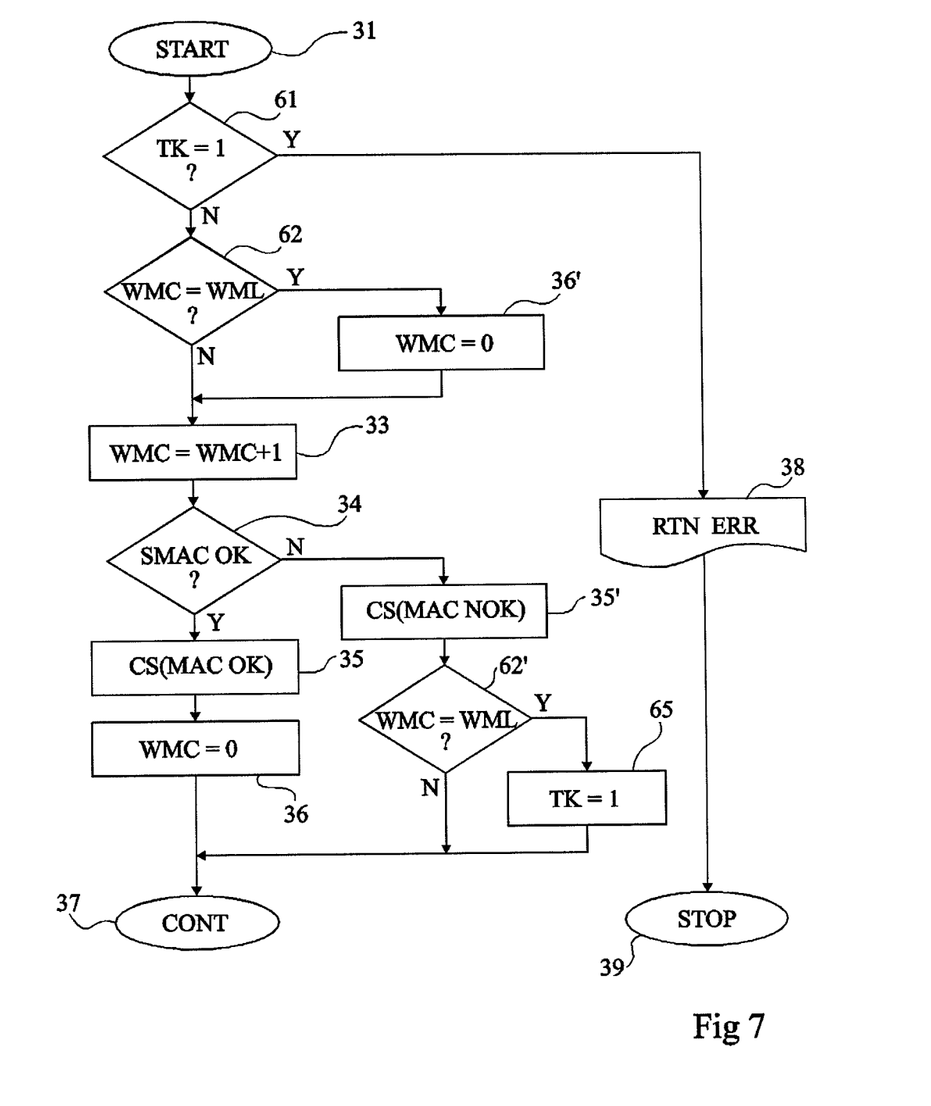
FIG. 7 is a functional diagram of an embodiment applied to a signature verification.

FIG. 7 is a functional diagram to be compared with that of FIG. 4 illustrating an embodiment in an application to a signature verification.

As previously, the beginning of the mechanism (block 31, START) follows the reception of a current signature SMAC (submitted MAC).

As in the embodiment of FIG. 6, it is verified (block 61, TK=1?) that the flag stored by circuit 100 is inactive (output N of block 61) before carrying on the signature verification. If charge retention circuit 100 provides a non-zero measurement (output Y of block 61), the error processing (block 38, RTN ERR) and the stopping (block 39, STOP) of the applications requesting the signature ratification are performed. As compared with usual procedures, the error processing does not definitively block the card.

As long as the time counter is inactive (output N of block 61), the wrong MAC counter (WMC) is tested (block 62, WMC=WML?) against limiting number WML.

If this number is not reached (output N of block 62), the counter of unsuccessful tries is incremented (block 33, WMC=WMC+1). If the limit is reached (output Y of block 62), the try counter is reset (block 36', WMC=0) before step 33.

Then, submitted signature SMAC is verified (block 34, SMAC OK?). In case of a correct verification (output Y of block 34), a status indicator CS is placed in a state corresponding to a correct verification of the signature (block 35, CS(MAC OK)) before resetting counter WMC (block 36, WMC=0) and carrying on (block 37, CONT) the processings provided by the application having required the signature verification.

If current signature SMAC is not correct (output N of block 34), indicator CS is placed in a corresponding state (block 35', CS(MAC NOK)). Then, according to this embodiment, the status of the number of tries is tested again against the limiting number (block 62', WMC=WML?). If the maximum number of tries is reached (output Y of block 62'), charge retention circuit 100 is activated (block 65, TK=1) before continuing the processing. Otherwise (output N of block 62'), the processing directly continues at step 37.

Thus, if the signature verification key is used too often for a given time period, the mechanism is blocked. However, this blocking stops after a predetermined time period. As a variation, processing 38 sets status bit CS as invalid CS(MAC NOK), then sends back to the continuation (block 37) of the application.

Be it for a code or for a signature, a reactivation of the electronic device after a given time is not disturbing in case of a hacking attempt. Indeed, it is then enough to take a sufficient function disabling time period (one or a few days are enough) for a possible person attempting to fraud to loose any interest in implementing his attack since it takes him too much time. As a specific example, the use of a same key a hundred times within a month can be considered as normal while this same use a hundred times within an hour must be interpreted as a potential attack.

However, the automatic reactivation enables considerable savings for the card provider.

According to another embodiment, applied to the use of passwords for secondary applications (for example, PKI different from a code of access to a main application (PIN code), the tries to key in passwords of the secondary applications are monitored by one or several charge retention circuits in the same way as for the PIN code, and in case of a blocking, the passwords are unlocked without requiring an intervention of the card provided. Said provider thus does not have to know the passwords submitted by the users.

According to another embodiment, one or several circuits 100 are activated by one or several mechanisms for detecting a circuit operation considered as abnormal. The detection can take the form of a monitoring of a program execution time, of the taking into or not of a variable given by a program, and more generally of any detection of a hardware or software action considered as abnormal if it occurs a given number of times. This limiting number (greater than or equal to one) is selected according to the application as in usual protection mechanisms which block an execution from a detected event threshold.

Such an embodiment can be induced from the examples discussed in relation with FIGS. 6 and 7 by replacing the current and limiting numbers of authentication tries with the current and limiting numbers of detected malfunctions.

It is no longer necessary to turn to the provider of the electronic device, be it physically or distantly, to unlock the circuit in case of a detected abnormal operation.

The usual exploitation of mechanisms detecting an abnormal operation, be it an authentication failure or any other operation considered as abnormal and justifying an action, needs not be modified.

Figure 8:
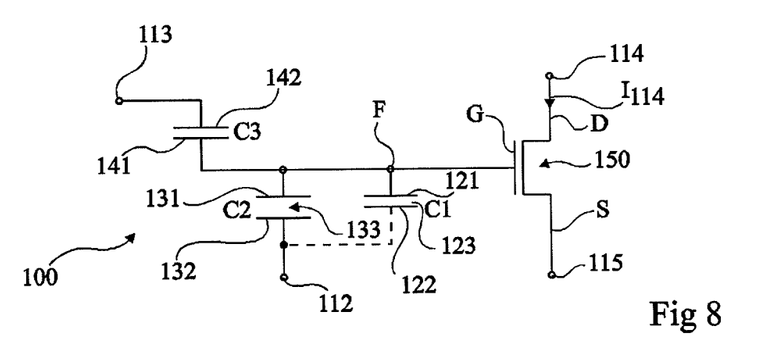
FIG. 8 shows an embodiment of an electronic charge retention circuit.

FIG. 8 shows a preferred example of a charge retention circuit 100.

Circuit 100 comprises a first capacitive element C1 having a first electrode 121 connected to a floating node F and having its dielectric space 123 designed (by its permittivity and/or by its thickness) to exhibit non-negligible leakages along time. "Floating node F" is used to designate a node which is not directly connected to any diffused region of the semiconductor substrate in which circuit 100 (and circuit 10') is preferentially formed and, more specifically, separated by a dielectric space from any voltage-application terminal. Second electrode 122 of capacitive element C1 is either connected (dotted lines in FIG. 2) to a terminal 112 intended to be connected to a reference voltage (for example, the ground), or left floating.

A second capacitive element C2 has its first electrode 131 connected to node F and a second electrode 132 connected to terminal 112. Capacitive element C2 exhibits a charge retention capacitance greater than that of capacitive element C1.

Preferably, a third capacitive element C3 has a first electrode 141 connected to node F and a second electrode 142 connected to a terminal 113 of circuit 100, intended to be connected to a supply source on initialization of a charge retention phase (activation of the stored bit to state 1).

A function of capacitive element C2 is to store an electric charge. A function of capacitive element C1 is to discharge capacitive element C2 relatively slowly (as compared with a direct connection of its electrode 131 to ground) due to a leakage through its dielectric space. The presence of capacitive element C2 enables dissociating the charge level present in circuit 100 from the discharge element (capacitance C1). The thickness of the dielectric of element C2 is greater than that of element C1. The capacitance of element C2 is greater, preferably by a ratio of at least 10, than that of element C2.

A function of capacitive element C3 is to enable a charge injection into capacitive element C2 by Fowler-Nordheim effect or by a hot electron injection phenomenon. Capacitive element C3 enables avoiding the stress on capacitive element C1 on charge of capacitive elements C2 and C1 in parallel. The thickness of the dielectric space of capacitive element C3 is greater than that of capacitive element C1, to avoid introducing a parasitic leakage path.

Node F is connected to a gate G of a transistor with an insulated control terminal (for example, a MOS transistor 150) having its conduction terminals (drain D and source S) connected to output terminals 114 and 115 to measure the residual charge contained in capacitive element C2 (neglecting the capacitance of capacitive element C1 in parallel). For example, terminal 115 is grounded and terminal 114 is connected to a current source (not shown) enabling the current-to-voltage conversion of drain current $I_{114}$ in transistor 150.

The thickness of the gate dielectric of transistor 150 is greater than that of the dielectric of capacitive element C1 to avoid introducing an additional leakage on node F. Preferably, the gate thickness of transistor 150 is even greater than the thickness of the dielectric of capacitive element C3, to avoid introducing a parasitic programming path (of injection or extraction of charges into or from node F).

The interpretation of the stored level can be performed simply by means of a comparator, the switching of which is performed as long as the charge of node F remains sufficient. The level for which the comparator switches then defines the state-switching level of the bit stored by element 100. Other read solutions may be envisaged, for example, a multiple-level interpretation in an embodiment where circuit 100 directly stores several bits.

Figure 9:
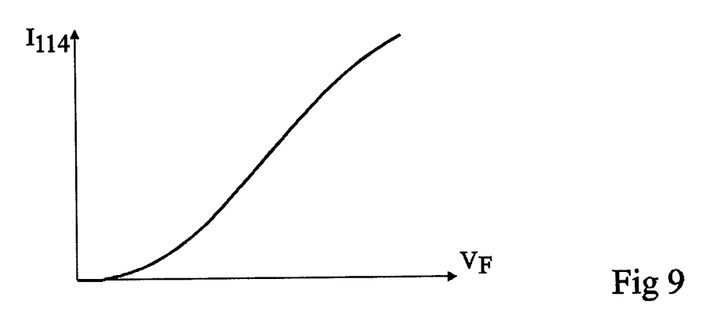
FIG. 9 is a current-vs.-voltage plot illustrating the operation of the circuit of FIG. 8.

FIG. 9 shows an example of the shape of drain current $I_{114}$ of transistor 150 according to voltage $V_F$ at node F, referenced with respect to terminal 115. Voltage $V_F$ then expresses the gate-source voltage of transistor 150. It depends on the residual charge across capacitive elements C1 and C2 in parallel, and thus essentially on the residual charge in capacitive element C2. The evaluation of drain current $I_{114}$ may be performed by maintaining terminals 112 and 115 at the same voltage (for example, the ground) and by applying a known voltage on terminal 114.

Figure 10:
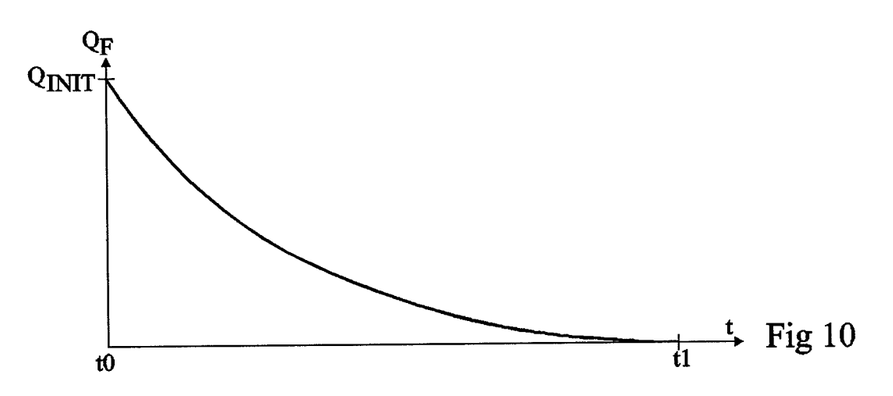
FIG. 10 is a timing diagram illustrating the operation of the circuit of FIG. 8.

FIG. 10 illustrates the variation of charge $Q_F$ at node F along time. At a time t0 when a supply (programming) voltage stops being applied on terminal 113, charge $Q_F$ starts from an initial value $Q_{INIT}$ to cancel at a time t1 with a capacitive discharge variation. The time interval between times t0 and t1 not only depends on the leakage capacitance of the dielectric of capacitive element C1, but also on the value (and thus on the storage capacitance) of capacitive element C2, which conditions value $Q_{INIT}$.

Assuming that terminals 112 and 115 and second electrode 122 of capacitive element C1 are at reference voltages and that terminal 114 is biased to a level determined so that a variation of current $I_{114}$ only originates from a variation of the voltage at node F, this variation then only depends on the time elapsed since time t0. This result is, in the shown embodiment, obtained due to the dissociation performed between the time leakage element (C1) and the element representative of the residual charge (C2).

The programming or activation of circuit 100 (switching to state 1 of the stored bit) through capacitive element C3 protects capacitive element C1 which has a relatively thin oxide (dielectric) thickness, which would otherwise risk being damaged in the programming. This especially enables making the measurements reliable and reproducible along time.

Several capacitive elements C3 may be connected in parallel between terminal 113 and node F to accelerate the programming time.

Similarly, the retention time may be adapted not only by setting the thicknesses and/or the permittivities of the dielectrics of capacitive elements C1 and C2, but also by providing several capacitive elements C1 and/or C2 in parallel.

Figure 11:
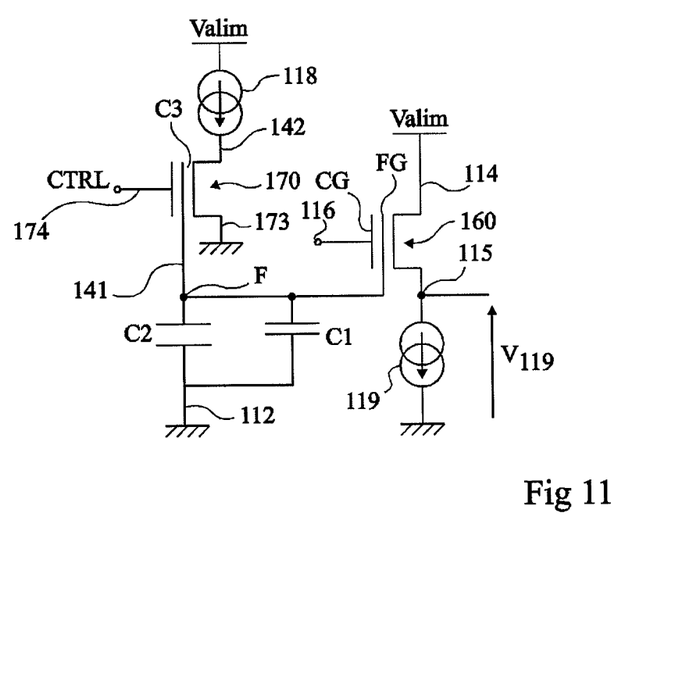
FIG. 11 shows another embodiment of a charge retention circuit in an example of environment.

FIG. 11 shows the electric diagram of another embodiment of a charge retention circuit 100'.

As compared with the embodiment of FIG. 8, transistor 150 is replaced with a transistor 160 with a floating gate FG connected to node F. Control gate CG of transistor 160 is connected to a terminal 116 for controlling the reading of the residual charge in circuit 100' (and thus of the state of the stored bit). The dielectric thickness, between floating gate FG and the channel (active area) of transistor 160, is greater than that of capacitive element C1 and preferentially greater than that of capacitive element C3.

Another difference is that charge injection or extraction element C3 is a floating-gate MOS transistor 170. Floating gate 141 of transistor 170 is connected to node F.

In the example of FIG. 11, the circuit has been shown in part of its environment. Drain 142 of transistor 170 is connected to a current source 118 receiving a supply voltage Valim and its source 173 is grounded. Its control gate 174 receives a control signal CTRL intended to turn on transistor 170 when charges need be injected. The drain (terminal 114) of transistor 160 receives supply voltage Valim and its source is grounded by a current source 119 (inverted variation with respect to the embodiment described in relation with FIG. 8). Voltage $V_{119}$ across current source 119 is representative of the voltage at node F and is used to switch the output of a comparator (not shown).

Figure 12:
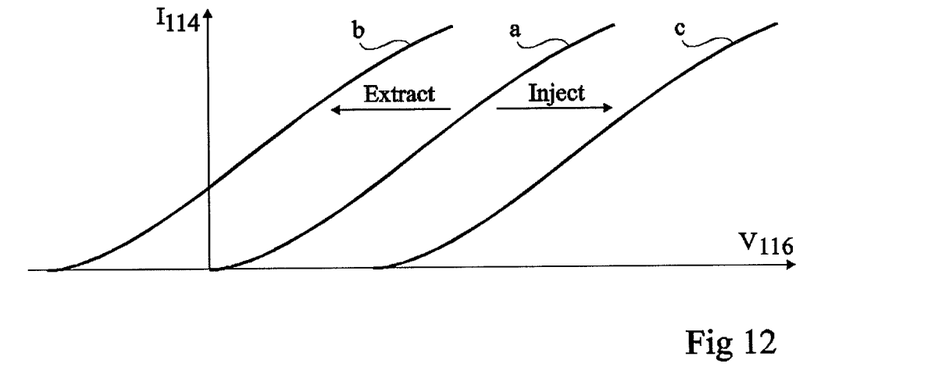
FIG. 12 is a current-vs.-voltage plot illustrating the operation of the circuit of FIG. 11.

FIG. 12 illustrates, in a plot of current $I_{114}$ versus voltage $V_{116}$ applied on the control gate, the operation of the circuit of FIG. 11. For explanation needs, it is assumed that the voltage between drain terminal 114 and source terminal 115 of transistor 160 is maintained constant by the external read circuit. The voltage drop between the floating gate and terminal 115 then depends on the electric charge present at node F, on the total capacitance between nodes F and 112 (essentially capacitances C1 and C2), and on the voltage applied on control gate 116 of transistor 160. In FIG. 12, three curves a, b, and c have been illustrated. Curve a shows the case where node F is fully discharged. Curve b shows the case of a positive charge present on node F (electron extraction). The threshold of transistor 160 is then lowered. Curve c shows the case of a negative charge on node F (electron injection), which generates a higher threshold for MOS transistor 160.

According to the applications, charges may be injected onto or extracted from node F to modify the characteristic of transistor 160 from curve a to one of curves b and c. Once isolated from the programming voltage, the leakage of capacitive element C1 enables returning along time to curve a. A measurement of current $I_{114}$ (and thus of voltage $V_{119}$) for a zero voltage $V_{116}$ enables detecting an expiry of the time (resetting of the bit to zero) when current $I_{114}$ becomes zero.

After, an extraction of electrons (application on terminal 113 of an activation or programming voltage positive with respect to terminal 112) by Fowler-Nordheim effect is assumed. The operation which will be described however easily transposes to an injection of electrons at node F, for example, by a so-called hot carrier phenomenon by applying adapted voltages between terminals 142, 173, and 174.

Different voltages may be used in programming and in read mode, provided to have an exploitable reference between the residual charge and the interpretation of the state of the stored bit.

According to a specific example of embodiment, a charge retention circuit is formed with the following values:
 Capacitance C1: 2 fF, dielectric thickness: 40 Å;
 Capacitance C2: 20 fF, dielectric thickness: 160 Å;
 Capacitance C3: 1 fF, dielectric thickness: 80 Å.

Such a circuit can be reset by application of a voltage on the order of 12 volts and is discharged after approximately one week. It is of course an example only, the dielectric thicknesses and the possible parallel association of several capacitive elements C1 or C2 conditioning the charge retention time.

FIGS. 13A, 13B, 13C, 14A, 14B, 14C, 15A, 15B, 15C, 16A, 16B, 16C, 17A, 17B, and 17C show an example of a circuit 100' according to the embodiment of FIG. 11 in an integrated structure, derived from an EEPROM memory architecture.

Figure 13A:
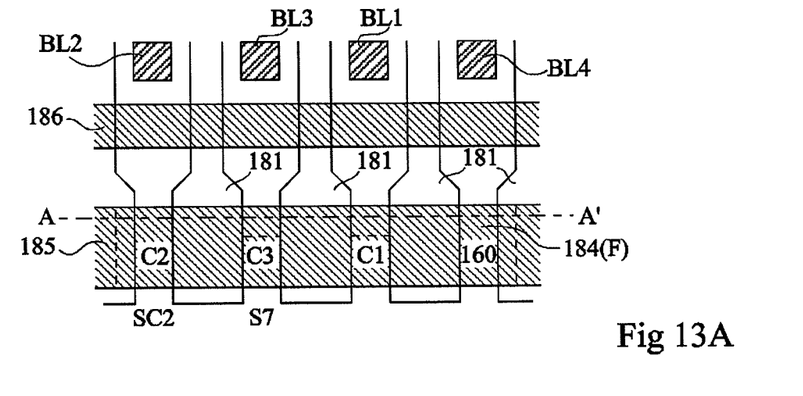
FIGS. 13A, 13B, and 13C respectively are a top view, a cross-section view along a first direction, and the equivalent electric diagram of an embodiment of an electronic charge retention circuit based on EEPROM cells.
Figure 13B:
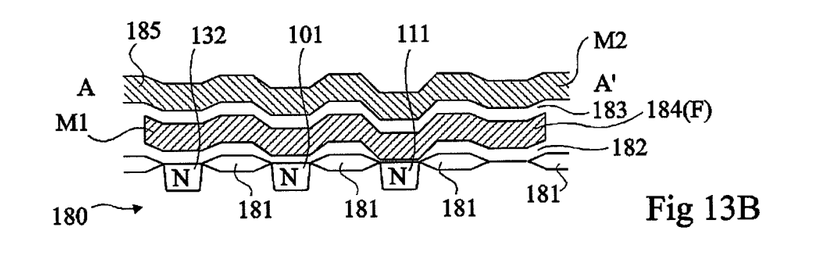
Figure 13C:
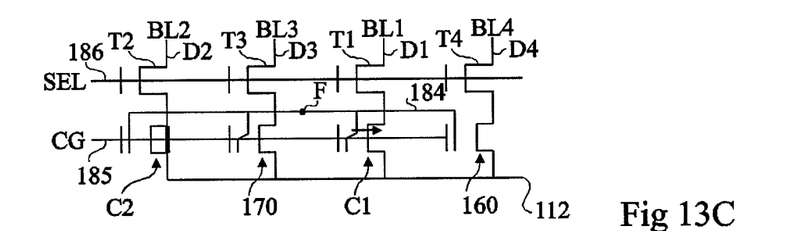

FIGS. 13A, 14A, 15A, 16A, and 17A are simplified top views, respectively, of the electronic charge retention circuit and of its elements C2, 170, C1, and 160. FIG. 13B is a cross-section view along line AA' of FIG. 13A. FIGS. 14B, 15B, 16B, and 17B respectively are cross-section views along lines BB' of FIGS. 14A, 15A, 16A, and 17A. FIGS. 13C, 14C, 15C, 16C, and 17C show the respective equivalent electric diagrams of the electronic charge retention circuit and of its elements C2, 170, C1, and 160.

An embodiment with N-channel transistors in a P-type silicon substrate 180 (FIG. 13B) is assumed. The inverse is of course possible.

Each element or cell C2, 170, C1, or 160 is obtained from a floating-gate transistor series-connected with a single-gate selection transistor T2, T3, T1, or T4 to select, for example from an EEPROM cell array network, the electronic charge retention circuit.

The floating gates of the different transistors forming elements C2, 170, C1, and 160 are interconnected (conductive line 184) to form floating node F. Their control gates are connected together to a conductive line 185 for applying read control signal CG. Their respective sources SC2, S7, SC1, and S6 are interconnected to terminal 112 (the ground) and their respective drains DC2, D7, DC1, and D6 are connected to the respective sources of selection transistors T2, T3, T1, and T4.

The gates of transistors T1 to T4 are connected together to a conductive line 186 of application of a selection signal SEL of the circuit. Their respective drains D1 to D4 are connected to individually-controllable bit lines BL1 to BL4. The order of the bit lines in FIG. 13C has been arbitrarily illustrated as BL2, BL3, BL1, and BL4 but the order of the different elements C2, 170, C1, and 160 in the horizontal direction of the rows (in the orientation of the drawings) is indifferent.

In this example of embodiment, N-type source and drain regions separated from one another in the line direction by insulating areas 181 are assumed (FIG. 13B). The floating gates are formed in a first conductive level M1 separated from the active regions by an insulating level 182 and the control gates are formed in a second conductive level M2 separated from the first one by a third insulating level 183. The gates of the selection transistors are formed, for example, in level M2.

A difference with respect to a usual EEPROM cell network is that the floating gates are interconnected by groups of four transistors to form floating node F. Another difference is that the floating-gate transistors forming the different circuit elements differ from one another by the thickness of their tunnel window and/or their drain and source connection.

Figure 14A:
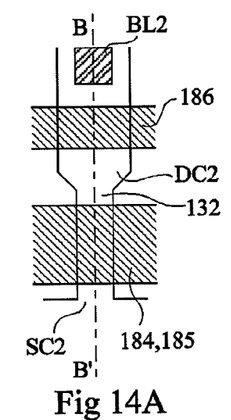
FIGS. 14A, 14B, and 14C respectively are a top view, a cross-section view along a second direction and the equivalent electric diagram of a first element of the circuit of FIGS. 13A to 13C.
Figure 14B:
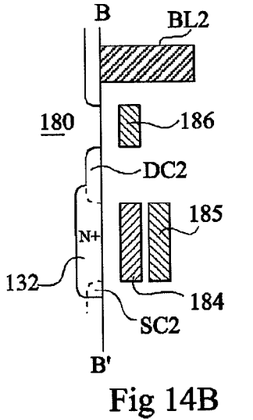
Figure 14C:
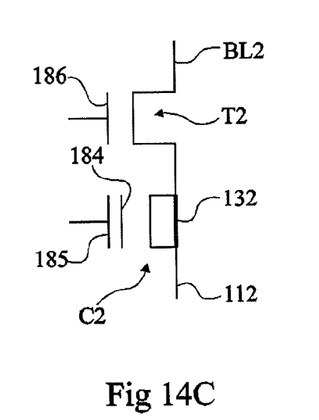

FIGS. 14A to 14C illustrate the forming of capacitive element C2. Drain DC2 and source SC2 of the corresponding floating-gate transistor are short-circuited (by extension of the $N^+$-type implantation across the entire active area, FIG. 14B) to form electrode 132 of the capacitor. Further, the tunnel window is eliminated with respect to a standard EEPROM cell.

Figure 15A:
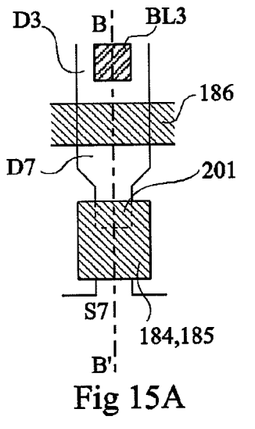
FIGS. 15A, 15B, and 15C respectively are a top view, a cross-section view along the second direction, and the equivalent electric diagram of a second element of the circuit of FIGS. 13A to 13C.
Figure 15B:
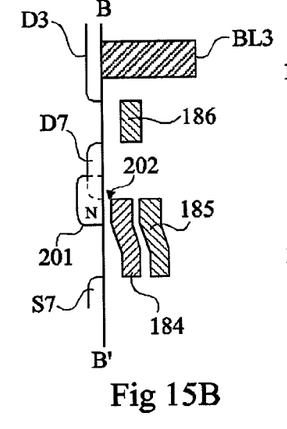
Figure 15C:
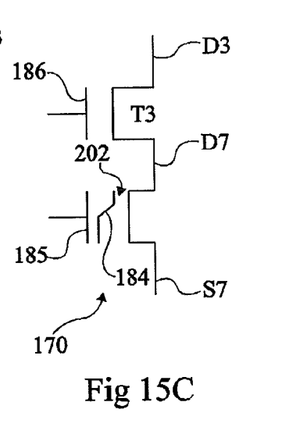

FIGS. 15A to 15C illustrate the forming of transistor 170 forming capacitive element C3. It is a standard EEPROM cell in which the extension 201 of the N doped area under tunnel window 202 (FIG. 15B) provides a platform in the charge injection area. Like for a standard EEPROM cell, drain area D7 is connected to the source of selection transistor T3. Source area S7 is connected to terminal 112.

Figures 16A, 16B:
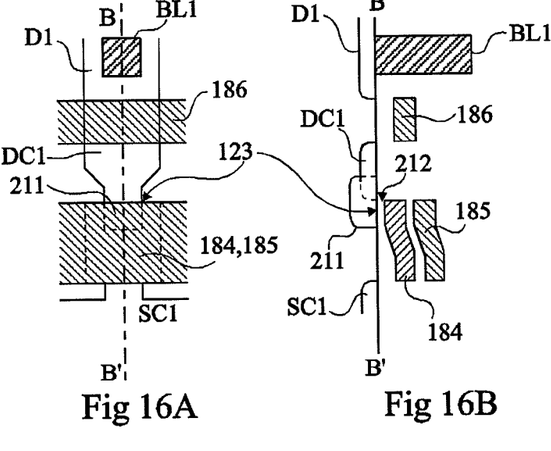
FIGS. 16A, 16B, and 16C respectively are a top view, a cross-section view along the second direction, and the equivalent electric diagram of a third element of the circuit of FIGS. 13A to 13C.
Figure 16C:
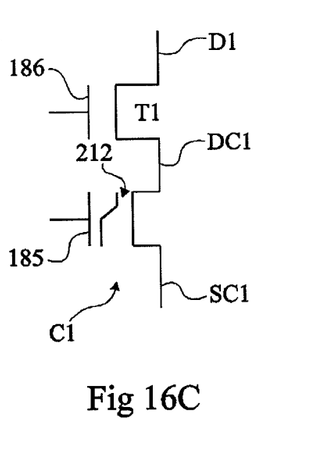

FIGS. 16A to 16C illustrate the forming of capacitive element C1 forming the leakage element of the charge retention circuit. As compared with a standard EEPROM cell, a difference is the thinning (area 212, FIG. 16B) of the dielectric window used for the tunnel effect to increase leakages. For example, dielectric thickness 212 is selected to be approximately half (for example, between 30 and 40 angströms) that (for example, between 70 and 80 angströms) of a tunnel window (202, FIG. 15B) of an unmodified cell.

Figures 17A, 17B:
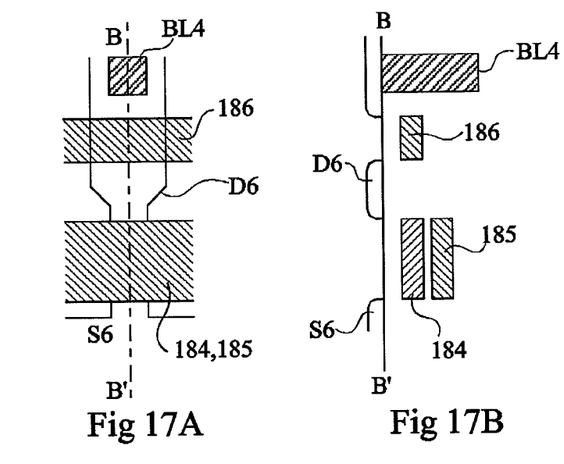
FIGS. 17A, 17B, and 17C respectively are a top view, a cross-section view along the second direction, and the equivalent electric diagram of a fourth element of the circuit of FIGS. 13A to 13C.
Figure 17C:
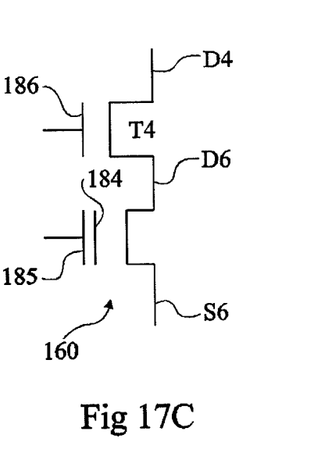

FIGS. 17A to 17C illustrate the forming of read transistor 160 in which the tunnel window has been eliminated as well as, preferably, the usual implanted area (201, FIG. 15B) of an EEPROM cell. The active area limited by source S6 and drain D6 is thus similar to that of a normal MOS transistor.

The representations of FIGS. 13A to 17C are simplified and may be adapted to the used technology. In particular, the gates have been shown as aligned with the limits of the drain and source areas, but a slight overlapping is often present.

An advantage of the embodiment by means of an EEPROM cell technology is that the charge retention circuit may be programmed and reset by applying the same voltage levels and the same time windows as those used to erase or write into EEPROM cells.

Another advantage is that this preserves a stability along time by avoiding the degradations of the thin oxide of the leakage element (C1) in successive write operations.

The respective connections of bit lines BL1 to BL4 depend on the circuit operating phases and especially on the programming (activation) or read phase.

Table I hereabove illustrates an embodiment of an activation (SET) and of a reading (READ) of an electronic charge retention circuit such as illustrated in FIGS. 13A to 17C.

TABLE I

|  | SEL | CG | BL2 | BL3 | BL1 | BL4 | 112 |
|---|---|---|---|---|---|---|---|
| SET | $VPP_1$ | 0 | HZ | $VPP_2$ | HZ | HZ | HZ |
| READ | $V_{SEL}$ | $V_{READ}$ | HZ | HZ | HZ | $V_{114}$ | 0 |

In an activation phase SET (switching of the stored bit to state 1), selection signal SEL is brought to a first high voltage $VPP_1$ with respect to ground to turn on the different transistors T1 to T4 while signal CG applied on the control gates of the floating-gate transistors remains at low level 0 to avoid turning on transistor 160. Bit lines BL1, BL2, and BL4 remain floating (high-impedance state HZ) while bit line BL3 is applied a positive voltage $Vpp_2$ enabling charge of floating node F. Line 112, common to the sources of the floating-gate transistors, is preferentially left floating HZ.

For reading READ, the different selection transistors are set by signal SEL to a level $V_{SEL}$ and a read voltage $V_{READ}$ is applied on the control gates of the different floating-gate transistors. Lines BL1, BL2, and BL3 are in a high impedance state HZ while line BL4 receives a voltage $V_{114}$ enabling supplying the read current source. Line 112 is here grounded.

The relations between the different levels $VPP_1$, $VPP_2$, $V_{SEL}$, $V_{READ}$, and $V_{114}$ are, preferably, the following:

$VPP_1$ greater than $VPP_2$;

$V_{SEL}$ greater than $V_{READ}$;

$V_{READ}$ on the same order of magnitude as $V_{114}$.

According to a specific example of embodiment:

$VPP_1$=14 volts;

$VPP_2$=12 volts;

$V_{SEL}$=4 volts;

$V_{READ}$=2 volts; and $V_{114}$=1 volt.

What has been described hereabove in relation with one EEPROM cell per element of the charge retention circuit may of course be replaced with a structure in which subsets of several identical cells in parallel are used for the different respective elements. In particular:

several elements C2 may be used in parallel to increase the capacitance of node F to increase the electronic circuit discharge time;

several elements 170 may be used in parallel to increase the electron injection or extraction speed at node F in a programming;

several leakage elements C1 may be used in parallel to decrease the system discharge time; and/or several read elements 160 may be introduced in parallel to provide a greater current on evaluation of the circuit.

An electronic charge retention circuit may be introduced in any position of a standard network of EEPROM cells, which enables making it more difficult to locate by a possible evil-disposed user.

The cell-selection transistors forming the charge retention transistors may be shared with normal EEPROM cells on the same bit lines, by providing adapted addressing and switching means.

Of course, the present invention is likely to have various alterations, modifications, and improvements which will readily occur to those skilled in the art. In particular, the charge retention circuit may be formed by any circuit likely to exhibit, in reproducible fashion, a charge loss along time independently from the circuit power supply. For example, a circuit such as described in International patent application WO-A-03/083769 may be used.

Further, the practical forming of the circuit based on the functional indications given hereabove and on the needs of the application is within the abilities of those skilled in the art. The counters may be of any nature and the counting function may be of any increment or decrement. For example (especially in embodiments, for example FIG. 8 et seq., where the counting cells cannot be reset otherwise than along time), two incremental counters of finite size, the difference of which provides the value to be considered, may be used.

Moreover, especially as it requires no permanent power supply, the present invention may be implemented in contact-less devices (of electromagnetic transponder type) which draw their power supply from an electromagnetic field in which they are present (generated by a terminal).

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A method, comprising:
   detecting a number of abnormal operations of an electronic circuit;
   in response to the detected number of abnormal operations reaching a limit, setting a charge retention circuit to an active state which causes at least one circuit function to be disabled, the charge retention circuit including at least one first capacitive element having a leakage that discharges the first capacitive element to an inactive state at the end of a disabling period that is independent of whether power is applied to the electronic circuit;
   resetting the detected number of abnormal operations to an initial value in response to a condition where the state of the charge retention circuit is inactive and the detected number of abnormal operations is at the limit; and
   resetting the detected number of abnormal operations to the initial value following each normal operation of the electronic circuit, wherein the at least one first capacitive element has a first electrode connected to a floating node and wherein the charge retention circuit further comprises at least one second capacitive element having a first electrode connected to the floating node, the second capacitive element having larger capacitance and a smaller leakage than the first capacitive element, and a measurement circuit connected to the floating node to measure a residual charge of the floating node.

2. The method of claim 1, comprising testing the state of the charge retention circuit before executing the at least one circuit function and preventing execution of the at least one circuit function if the charge retention circuit is in the active state.

3. The method of claim 1, wherein setting the charge retention circuit to the active state comprises injection or extraction of charges into or from the first capacitive element.

4. The method of claim 1, wherein detecting a number of abnormal operations comprises incrementing or decrementing a counter toward a limit in response to each abnormal operation.

5. The method of claim 4, comprising testing a value of the counter after each abnormal operation and setting the charge retention circuit to the active state if the counter has reached the limit.

6. An electronic circuit, comprising:
a charge retention circuit including at least one first capacitive element having a leakage that discharges the first capacitive element to an inactive state at the end of a time period, the time period being independent of a power status of the electronic circuit; and
a controller configured to:
detect a number of abnormal operations of the electronic circuit;
in response to the detected number of abnormal operations reaching a limit, set the charge retention circuit to an active state which causes at least one circuit function to be disabled;
reset the detected number of abnormal operations to an initial value in response to a condition where the state of the charge retention circuit is inactive and the detected number of abnormal operations is at the limit; and
reset the detected number of abnormal operations to the initial value following each normal operation of the at least one circuit function, wherein the at least one first capacitive element has a first electrode connected to a floating node and wherein the charge retention circuit further comprises at least one second capacitive element having a first electrode connected to the floating node, the second capacitive element having a larger capacitance and a smaller leakage than the first capacitive element, and a measurement circuit connected to the floating node to measure a residual charge of the floating node.

7. The electronic circuit of claim 6 wherein the controller is configured to test the state of the charge retention circuit before executing the at least one circuit function and to prevent execution of the at least one circuit function if the charge retention circuit is in the active state.

8. The electronic circuit of claim 6 wherein setting the charge retention circuit to the active state comprises injection or extraction of charges into or from the first capacitive element.

9. The electronic circuit of claim 6, wherein the controller is configured to test a value of a counter after each detected abnormal operation and to set the charge retention circuit to the active state if the counter has reached the limit.

10. A method, comprising:
testing a state of a charge retention circuit before executing a circuit function of an electronic circuit, the charge retention circuit including at least one first capacitive element having a leakage that discharges the first capacitive element to an inactive state at the end of a time period that is independent of whether power is applied to the electronic circuit, wherein the at least one first capacitive element has a first electrode connected to a floating node and wherein the charge retention circuit further comprises at least one second capacitive element having a first electrode connected to the floating node, the second capacitive element having a larger capacitance and a smaller leakage than the first capacitive element, and a measurement circuit connected to the floating node to measure a residual charge of the floating node;
if the charge retention circuit is in an active state, preventing execution of the circuit function;
resetting a counter to an initial value in response to a condition where the charge retention circuit is in an inactive state and the value of the counter is at a limit, incrementing or decrementing the counter toward the limit, and executing the circuit function;
in the case of normal execution of the circuit function, resetting the counter to the initial value;
in the case of abnormal execution of the circuit function, testing the value of the counter; and
if the value of the counter is at the limit, setting the charge retention circuit to the active state.

11. The method of claim 10, wherein setting the charge retention circuit to the active state comprises injection or extraction of charges into or from the first capacitive element.

12. The method of claim 10 wherein a second electrode of the second capacitive element is configured to couple to a first reference voltage terminal and the charge retention circuit includes at least one third capacitive element having a first electrode connected to said floating node and a second electrode configured to couple to a second reference voltage terminal different from the first reference voltage terminal.

13. An electronic device, comprising:
a charge retention circuit including:
a first capacitive element having a first electrode coupled to a floating node;
a second capacitive element having a first electrode coupled to the floating node and a second electrode coupled to a reference-voltage terminal;
a third capacitive element having a first electrode coupled to the floating gate and a second electrode coupled to an activation terminal, wherein the activation terminal is different from the reference-voltage terminal; and
a transistor having a gate terminal coupled to the floating gate, wherein the charge retention circuit is configured to transition from an active state to an inactive state when a transition time period elapses after the charge retention circuit enters the active state; and
control circuitry coupled to the charge retention circuit and configured to:
selectively cause the charge retention circuit to enter the active state; and
control operation of at least one function of the electronic device based on the state of the charge retention circuit, wherein the control circuitry is configured to:

detect a number of abnormal operations of the at least one function of the electronic device;

when the detected number of abnormal operations reaches a limit, cause the charge retention circuit to enter the active state, wherein the function of the electronic device is disabled when the charge retention circuit is in the active state;

reset the detected number of abnormal operations to an initial value when the charge retention circuit is in the inactive state and the detected number of abnormal operations is at the limit; and reset the detected number of abnormal operations to the initial value following each normal operation of the function of the electronic device;

wherein the first capacitive element has a larger leakage and smaller capacitance than the second capacitive element.

14. The electronic device of claim 13 wherein the control circuitry is configured to reset the detected number of abnormal operations to the initial value when the charge retention circuit is in the inactive state and the detected number of abnormal operations is above the limit.

15. The electronic device of claim 13 wherein the first capacitive element includes a second electrode coupled to the reference-voltage terminal.

16. The electronic device of claim 13 wherein the gate terminal of the transistor is a terminal of an insulated control gate of the transistor.

17. The electronic device of claim 13 wherein the gate terminal of the transistor is a terminal of a floating gate of the transistor.

18. The electronic device of claim 13, comprising:

a network of EEPROM-type memory cells, wherein the first capacitive element comprises a first floating gate transistor of the network, the second capacitive element comprises a second floating gate transistor of the network, the third capacitive element comprises a third floating gate transistor of the network, and the transistor of the charge retention circuit comprises a fourth floating gate transistor of the network.

19. The electronic device of claim 18 wherein, the first floating gate transistor has a dielectric thickness of a tunnel window that is smaller than a dielectric thickness of the second floating gate transistor; and a drain and a source of the second floating gate transistor are coupled together.

20. The electronic device of claim 13, comprising a network of EEPROM-type memory cells, each including a selection transistor in series with a floating-gate transistor, and wherein, on a same row of memory cells where the respective floating gates of the cell transistors are interconnected:

the first capacitive element comprises a first subset of at least one first cell where the thickness of the dielectric of the tunnel window of the floating gate transistor is smaller than that of the other cells;

the second capacitive element comprises a second subset of at least one second cell where the drain and the source of the floating-gate transistor are interconnected;

the third capacitive element comprises a third subset of at least one third cell; and the transistor of the charge retention circuit comprises a fourth subset of at least one fourth cell having its tunnel window eliminated.

* * * * *